US011057977B2

(12) United States Patent
Saito et al.

(10) Patent No.: US 11,057,977 B2
(45) Date of Patent: Jul. 6, 2021

(54) MULTIPLE-OUTPUT LOAD DRIVING DEVICE

(71) Applicant: Rohm Co., Ltd., Kyoto (JP)

(72) Inventors: Tomoya Saito, Kyoto (JP); Krishnachandran Krishnan Nair, Kyoto (JP); Mathew George, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/958,592

(22) PCT Filed: Dec. 27, 2018

(86) PCT No.: PCT/JP2018/048216
§ 371 (c)(1),
(2) Date: Jun. 26, 2020

(87) PCT Pub. No.: WO2019/135392
PCT Pub. Date: Jul. 11, 2019

(65) Prior Publication Data

US 2020/0359483 A1 Nov. 12, 2020

(30) Foreign Application Priority Data

Jan. 5, 2018 (JP) ............................ JP2018-000725

(51) Int. Cl.
*H05B 45/54* (2020.01)
*H05B 45/325* (2020.01)
(Continued)

(52) U.S. Cl.
CPC ........... *H05B 45/54* (2020.01); *B60Q 1/2607* (2013.01); *G05F 1/569* (2013.01); *H05B 45/325* (2020.01)

(58) Field of Classification Search
CPC ...... H05B 45/54; H05B 45/325; H05B 47/20; H05B 47/10; H05B 45/46; H05B 47/21; H05B 45/52; B60Q 1/2607; G05F 1/569
See application file for complete search history.

(56) References Cited

U.S. PATENT DOCUMENTS

| | | | | |
|---|---|---|---|---|
| 2012/0074856 A1* | 3/2012 | Takata | H05B 45/48 | 315/192 |
| 2013/0015781 A1* | 1/2013 | Kanemitsu | H05B 45/50 | 315/291 |

(Continued)

FOREIGN PATENT DOCUMENTS

| | | |
|---|---|---|
| CN | 202759636 | 2/2013 |
| CN | 106256173 | 12/2016 |

(Continued)

OTHER PUBLICATIONS

Intellectual Property Office of India, First Examination Report for IN Application No. 202017028413, dated Dec 2, 2020 (6 pages).

(Continued)

*Primary Examiner* — Daniel D Chang
(74) *Attorney, Agent, or Firm* — Fish & Richardson P.C.

(57) ABSTRACT

A multiple-output load driving device includes a plurality of output terminals (OUT1 to OUT4) for outputting an output current to each of a plurality of loads (Z1 to Z4), a control portion (8) configured to select either a non-DC current mode in which a non-DC current is used as the output current or a DC current mode in which a DC current is used as the output current, and a first terminal (MSET2). In a case where a low-level signal is supplied to the first terminal, in the non-DC current mode, the non-DC current is outputted from all of the plurality of output terminals. In a case where a high-level signal is supplied to the first terminal, in the non-DC current mode, the DC current is outputted from a (Continued)

predetermined one (OUT4) of the output terminals, while the non-DC current is outputted from the other output terminals (OUT1 to OUT3).

21 Claims, 13 Drawing Sheets

(51) Int. Cl.
*B60Q 1/26* (2006.01)
*G05F 1/569* (2006.01)

(56) References Cited

U.S. PATENT DOCUMENTS

| | | | | |
|---|---|---|---|---|
| 2013/0016310 | A1* | 1/2013 | Kanemitsu | G02F 1/133603 349/69 |
| 2016/0174306 | A1 | 6/2016 | Chien | |
| 2016/0255693 | A1 | 9/2016 | Wang et al. | |

FOREIGN PATENT DOCUMENTS

| | | |
|---|---|---|
| CN | 107205295 | 9/2017 |
| EP | 3220719 | 9/2017 |
| JP | 2004034741 | 2/2004 |
| JP | 2013021117 | 1/2013 |
| JP | 2017165384 | 9/2017 |
| KR | 20170124948 | 11/2017 |
| TW | 2015-43956 A | 11/2015 |
| TW | 201633849 | 9/2016 |
| WO | 2016138204 | 9/2016 |

OTHER PUBLICATIONS

Japan Patent Office, International Search Report for PCT/JP2018/048216 dated Mar. 26, 2019 with English translation.

* cited by examiner

| Abnormality in External Terminals OUT1 to OUT3 | Absent | | |
|---|---|---|---|
| Abnormality in External Terminal OUT4 | Absent | Present | Absent |
| VPBUS | ⎯⎯⎯ | ⎯⎯⎯ | ⎯⎯⎯ HIGH / LOW |
| LED String Z1 | On | Off | On |
| LED String Z2 | On | Off | On |
| LED String Z3 | On | Off | On |
| LED String Z4 | On | Off | On |

| Abnormality in External Terminals OUT2 to OUT4 | Absent | | |
|---|---|---|---|
| Abnormality in External Terminal OUT1 | Absent | Present | Absent |
| VPBUS | HIGH | LOW | HIGH |
| LED String Z1 | On | Off | On |
| LED String Z2 | On | Off | On |
| LED String Z3 | On | Off | On |
| LED String Z4 | On | Off | On |

MULTIPLE-OUTPUT LOAD DRIVING DEVICE

TECHNICAL FIELD

The present invention relates to a multiple-output load driving device (for example, an LED driver IC incorporated in an LED lamp module for a motorcycle).

BACKGROUND ART

FIG. 13 is a view showing a typical configuration example of a light-emitting device having a tail lamp and a stop lamp that are provided in a vehicle. The light-emitting device shown in FIG. 13 includes switches SW101 and SW102, diodes D101 to D102, resistors R101 to R102, and LED strings Z101 to Z104.

In a tail mode in which the tail lamp is turned on, the switch SW101 comes into an on-state, while the switch SW102 comes into an off-state, and a current outputted from a battery BAT is supplied to the LED strings Z101 to Z104 via the switch SW101, the diode D101, the resistor R101, and the resistor R102.

In a stop mode in which the stop lamp is turned on, the switch SW10 comes into the off-state, while the switch SW102 comes into the on-state, and a current outputted from the battery BAT is supplied to the LED strings Z101 to Z104 via the switch SW102, the diode D102, and the resistor R102.

In the stop mode, a current outputted from the battery BAT is larger than in the tail mode, and thus the LED strings Z101 to Z104 are turned on at a brightness level higher than in the tail mode.

Patent Document 1 proposes a tail/stop lamp including a tail lamp and a stop lamp each constituted of a plurality of systems of LEDs so that each of the tail lamp and the stop lamp has redundancy. The tail/stop lamp is periodically turned on and thus achieves an increase in service life of the LEDs. Also, upon a wire break being detected in any of the LEDs, only the other LEDs in which no wire break has occurred are turned on.

LIST OF CITATIONS

Patent Literature

Patent Document 1: JP-A-2004-34741

SUMMARY OF THE INVENTION

Technical Problem

In addition to the tail lamp and the stop lamp, a license lamp that illuminates a number plate is also provided at a rear part of the vehicle. Hence, in addition to a specification in which the tail lamp and the stop lamp are used as loads, the light-emitting device may possibly have a specification in which the tail lamp, the stop lamp, and the license lamp are used as loads. Further, how to perform proper control varies with different specifications of loads. According to the conventional technique, however, it has been impossible to switch between control specifics so that loads having various specifications can be used. This problem arises also in a case of a load other than a light-emitting element.

In view of the above-described circumstances, it is an object of the present invention to provide a multiple-output load driving device that is capable of switching between control specifics.

Solution to the Problem

A multiple-output load driving device according to one aspect disclosed herein includes a plurality of output terminals for outputting an output current to each of a plurality of loads, a control portion configured to select either a non-DC current mode in which a non-DC current is used as the output current or a DC current mode in which a DC current is used as the output current, and a first terminal. The multiple-output load driving device has a configuration (a first configuration) in which in a case where a first signal is supplied to the first terminal, in the non-DC current mode, the non-DC current is outputted from all of the plurality of output terminals, and in a case where a second signal different from the first signal is supplied to the first terminal, in the non-DC current mode, the DC current is outputted from a predetermined output terminal among the plurality of output terminals, while the non-DC current is outputted from a rest of the plurality of output terminals other than the predetermined output terminal.

Furthermore, the multiple-output load driving device according to the above-described first configuration may have a configuration (a second configuration) further including an abnormality detection portion configured to detect an abnormality in the predetermined output terminal and a second terminal. In this configuration, in a case where a third signal is supplied to the second terminal, when an abnormality in the predetermined output terminal has been detected by the abnormality detection portion, the output current is stopped from being outputted from the rest of the plurality of output terminals other than the predetermined output terminal, and in a case where a fourth signal different from the third signal is supplied to the second terminal, even when an abnormality in the predetermined output terminal has been detected by the abnormality detection portion, the output current is outputted from the rest of the plurality of output terminals other than the predetermined output terminal.

Furthermore, the multiple-output load driving device according to the above-described second configuration may have a configuration (a third configuration) further including a third terminal. In this configuration, in the case where the third signal is supplied to the second terminal, a signal indicative of an abnormality is outputted from the third terminal, and in the case where the fourth signal is supplied to the second terminal, the signal indicative of an abnormality is not outputted from the third terminal.

Furthermore, the multiple-output load driving device according to the above-described second or third configuration may have a configuration (a fourth configuration) in which the first terminal is identical to the second terminal, the first signal is identical to the third signal, and the second signal is identical to the fourth signal.

Furthermore, the multiple-output load driving device according to any of the above-described first to fourth configurations may have a configuration (a fifth configuration) in which the plurality of output terminals are three or more output terminals, and the predetermined output terminal is a single output terminal.

Furthermore, the multiple-output load driving device according to the above-described first configuration may have a configuration (a sixth configuration) further including a plurality of abnormality detection portions configured to detect an abnormality in the plurality of output terminals, respectively, and a second terminal. In this configuration, in a case where a third signal is supplied to the second terminal, when an abnormality has been detected by at least one of the plurality of abnormality detection portions, the output current is stopped from being outputted from all of the plurality of output terminals, and in a case where a fourth signal different from the third signal is supplied to the second terminal, even when an abnormality has been detected by at least one of the plurality of abnormality detection portions, the output current is outputted from, among the plurality of output terminals, an output terminal corresponding to any of the plurality of abnormality detection portions that has not detected the abnormality.

Furthermore, the multiple-output load driving device according to the above-described sixth configuration may have a configuration (a seventh configuration) further including a third terminal. In this configuration, when an abnormality has been detected by at least one of the plurality of abnormality detection portions, a signal indicative of an abnormality is outputted from the third terminal.

A multiple-output load driving device according to another aspect disclosed herein has a configuration (an eighth configuration) including a plurality of output terminals for outputting an output current to each of a plurality of loads, an abnormality detection portion configured to detect an abnormality in a predetermined output terminal among the plurality of output terminals, and a first terminal. In this configuration, in a case where a first signal is supplied to the First terminal, when an abnormality in the predetermined output terminal has been detected by the abnormality detection portion, the output current is stopped from being outputted from a rest of the plurality of output terminals other than the predetermined output terminal, and in a case where a second signal different from the first signal is supplied to the first terminal, even when an abnormality in the predetermined output terminal has been detected by the abnormality detection portion, the output current is outputted from the rest of the plurality of output terminals other than the predetermined output terminal.

A multiple-output load driving device according to still another aspect disclosed herein has a configuration (a ninth configuration) including a plurality of output terminals for outputting an output current to each of a plurality of loads, a plurality of abnormality detection portions configured to detect an abnormality in the plurality of output terminals, respectively, and a first terminal. In this configuration, in a case where a first signal is supplied to the first terminal, when an abnormality has been detected by at least one of the plurality of abnormality detection portions, the output current is stopped from being outputted from all of the plurality of output terminals, and in a case where a second signal different from the first signal is supplied to the first terminal, even when an abnormality has been detected by at least one of the plurality of abnormality detection portions, the output current is outputted from, among the plurality of output terminals, an output terminal corresponding to any of the plurality of abnormality detection portions that has not detected the abnormality.

Furthermore, the multiple-output load driving device according to any of the above-described first to ninth configurations may have a configuration (a tenth configuration) further including a high-withstand-voltage terminal and a low-withstand-voltage terminal having a withstand voltage lower than a withstand voltage of the high-withstand-voltage terminal. In this configuration, the first terminal or the second terminal is disposed between the high-withstand-voltage terminal and the low-withstand-voltage terminal.

Furthermore, the multiple-output load driving device according to any of the above-described first to tenth configurations may have a configuration (an eleventh configuration) further including a first input terminal for accepting an input of a first input current from a power source, a second input terminal for accepting an input of a second input current from the power source via an external resistor, a current distribution portion configured to add together the first input current and the second input current at a predetermined distribution ratio so as to generate a driving current, a distribution control portion configured to control the distribution ratio, and a plurality of driving circuits. In this configuration, the driving current is supplied to a connection node of input ends of the plurality of driving circuits, and output ends of the plurality of driving circuits are connected to the plurality of output terminals, respectively. In a plan view of a semiconductor chip, a disposition region of a power control section including the current distribution portion and the distribution control portion is located near a first side of the semiconductor chip, and disposition regions of main bodies of the plurality of driving circuits are located near a second side of the semiconductor chip that is opposite to the first side.

Furthermore, the multiple-output load driving device according to the above-described eleventh configuration may have a configuration (a twelfth configuration) in which the disposition region of the power control section and each of the disposition regions of the main bodies of the plurality of driving circuits do not overlap with each other as viewed from a first direction substantially parallel to the first side and the second side.

Furthermore, the multiple-output load driving device according to the above-described eleventh or twelfth configuration may have a configuration (a thirteenth configuration) in which the disposition region of the power control section is located at an end of the semiconductor chip in the first direction substantially parallel to the first side and the second side.

Furthermore, the multiple-output load driving device according to any of the above-described eleventh to thirteenth configurations may have a configuration (a fourteenth configuration) in which the disposition regions of the main bodies of the plurality of driving circuits are arranged along the first direction substantially parallel to the first side and the second side and overlap with each other as viewed ion the first direction.

Furthermore, the multiple-output load driving device according to any of the above-described eleventh to fourteenth configurations may have a configuration (a fifteenth configuration) in which a plurality of pads wire-bonded to the plurality of output terminals, respectively, are arranged along the first direction substantially parallel to the first side and the second side and overlap with each other as viewed from the first direction.

Furthermore, the multiple-output load driving device according to any of the above-described eleventh to fifteenth configurations may have a configuration (a sixteenth configuration) further including an overheat protection portion. In this configuration, a midpoint of a region, into which the disposition regions of the main bodies of the plurality of driving circuits are integrated, in the first direction substantially parallel to the first side and the second side is located between one end and the other end of a disposition region of the overheat protection portion in the first direction as viewed from a second direction orthogonal to the first direction.

Furthermore, the multiple-output load driving device according to any of the above-described eleventh to sixteenth configurations may have a configuration (a seventeenth configuration) in which disposition regions of fuses of the plurality of driving circuits are arranged along a second direction substantially orthogonal to the first side and the second side and overlap with each other as viewed from the second direction.

Furthermore, the multiple-output load driving device according to the above-described sixth or seventh configuration may have a configuration (an eighteenth configuration) further including a first input terminal for accepting an input of a first input current from a power source, a second input terminal for accepting an input of a second input current from the power source via an external resistor, a current distribution portion configured to add together the first input current and the second input current at a predetermined distribution ratio so as to generate a driving current, a distribution control portion configured to control the distribution ratio, and a plurality of driving circuits. In this configuration, the driving current is supplied to a connection node of input ends of the plurality of driving circuits, and output ends of the plurality of driving circuits are connected to the plurality of output terminals, respectively. In a plan view of a semiconductor chip, a disposition region of a power control section including the current distribution portion and the distribution control portion is located near a first side of the semiconductor chip, disposition regions of main bodies of the plurality of driving circuits are located near a second side of the semiconductor chip that is opposite to the first side, and a disposition region of a first switch controlled by the first signal and the second signal and a disposition region of a second switch controlled by the third signal and the fourth signal are located near the first side of the semiconductor chip.

A lamp module disclosed herein has a configuration (a nineteenth configuration) including the multiple-output load driving device according to any of the above-described first to eighteenth configurations and a light source that is connected as a load to an output terminal of the multiple-output load driving device.

A vehicle disclosed herein has a configuration (a twentieth configuration) including the lamp module according to the above-described nineteenth configuration and a batter that is used as a power source for the lamp module.

The vehicle according to the above-described twentieth configuration may have a configuration (a twenty-first configuration) in which the vehicle is a motorcycle, and the lamp module is a lamp module including a tail lamp, a stop lamp, and a license lamp.

Advantageous Effects of the Invention

According to the invention disclosed herein, it is possible to provide a multiple-output load driving device that is capable of switching between control specifics.

DESCRIPTION OF EMBODIMENTS

<Configuration of Light-Emitting Device>

Figure 1:
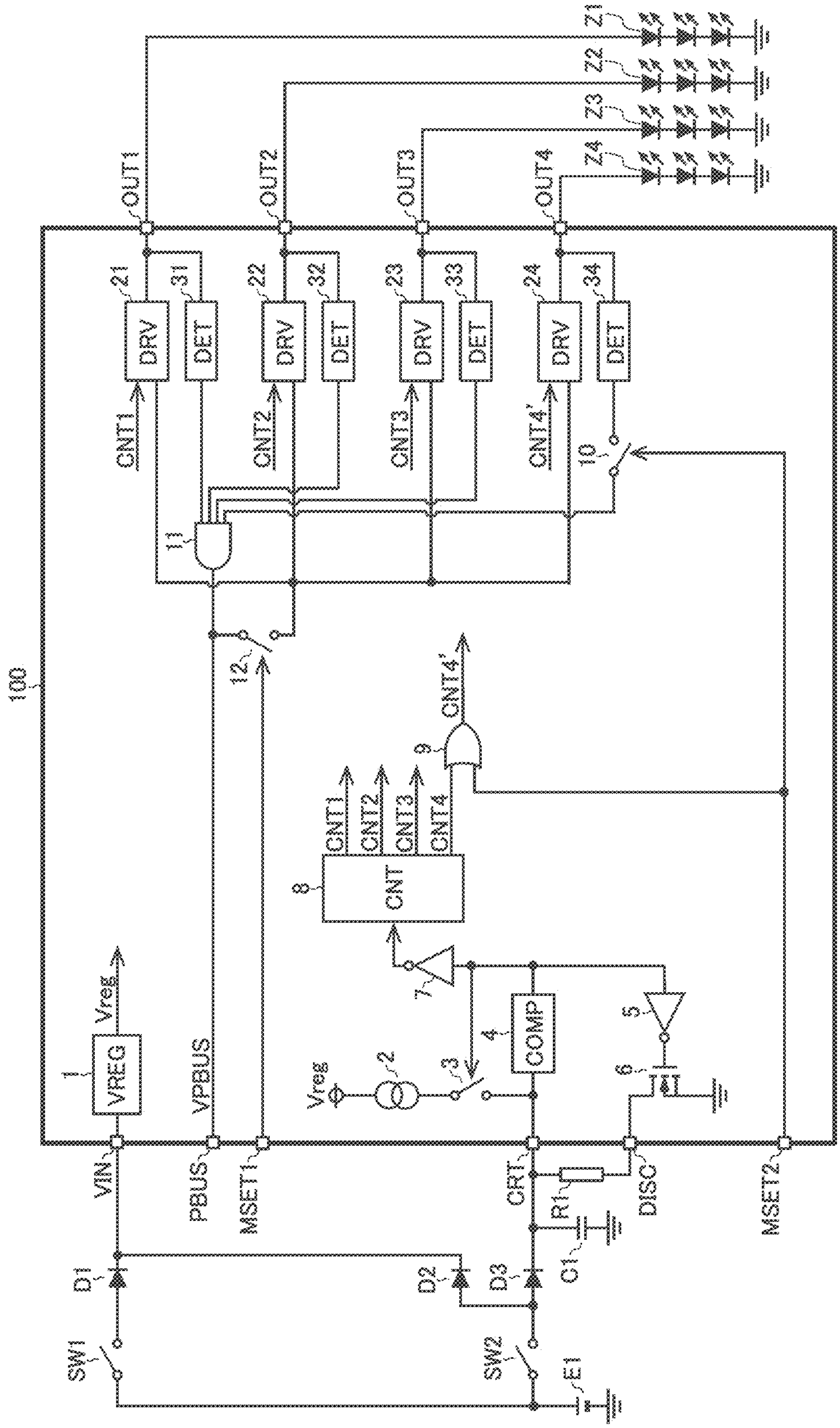
FIG. 1 is a view showing one configuration example of an LED lamp module.

FIG. 1 is a view showing one configuration example or an LED lamp module. The LED lamp module according to this configuration example includes a multiple-output load driving device 100 and external components externally mounted thereto. The external components include switches SW1 to SW2, diodes D1 to D3, a capacitor C1, a resistor R1, and LED strings Z1 to Z4.

The multiple-output load driving device 100 is a semiconductor integrated circuit device (a so-called four-channel LED driver IC) that receives a voltage outputted from a battery E1 and outputs an output current to each of the LED strings Z1 to Z4. The multiple-output load driving device 100 is provided with a plurality of external terminals (FIG. 1 explicitly shows only external terminals VIN, PBUS, MSET1, CRT, DISC, MSET2, and OUT1 to OUT4 as representative examples) for stablishing electrical connection with the exterior of the device.

A negative electrode of the battery E1 is connected to a ground end. A positive electrode of the battery E1 is connected to one end of the switch SW1 and one end of the switch SW2. The other end of the switch SW1 is connected to an anode of the diode D1, and the other end of the switch SW2 is connected to an anode of the diode D2 and an anode of the diode D3.

A cathode of the diode D1 and a cathode of the diode D2 are connected to the external terminal VIN. A cathode of the diode D3 is connected to the external terminal CRT. One end of the capacitor C1 and one end of the resistor R1 are also connected to the external terminal CRT. The other end of the capacitor C1 is connected to a ground end, and the other end of the resistor R1 is connected to the external terminal DISC.

Anodes of the LED strings Z1 to Z4 are connected to the external terminals OUT1 to OUT4, respectively, and cathodes of the LED strings Z1 to Z4 are connected to ground ends, respectively.

<Internal Configuration of Multiple-Output Load Driving Device>

Subsequently, with reference to FIG. 1, a description is given of an internal configuration of the multiple-output load driving device 100. In the multiple-output load driving device 100, there are integrated a reference voltage generation portion 1, a constant current source 2, a switch 3, a voltage comparison portion 4, an inverter 5, a MOS transistor 6, an inverter 7, a control portion 8, an OR gate 9, a switch 10, an AND gate 11, a switch 12, driving circuits 21 to 24, and abnormality detection circuits 31 to 34.

The reference voltage generation portion 1 uses a voltage supplied to the external terminal VIN to generate a reference voltage Vreg and supplies the reference voltage Vreg to various portions in the multiple-output load driving device 100.

In a case where the switch SW1 is in an on-state and the switch SW2 is in an off-state, the multiple-output load driving device 100 comes into a PWM current mode. In the PWM current mode, when the switch 3 is in the on-state, the capacitor C1 is charged by the constant current source 2. Until a charging voltage of the capacitor C1 reaches a first threshold value, the voltage comparison portion 4 outputs a high-level signal. After the charging voltage of the capacitor C1 has reached the first threshold value and until it falls below a second threshold value (<the first threshold value), the voltage comparison portion 4 outputs a low-level signal. When an output signal of the voltage comparison portion 4 has a high level, the switch 3 comes into the on-state and the MOS transistor 6 comes into the off-state. In contrast, when an output signal of the voltage comparison portion 4 has a low level, the switch 3 comes into the off-state and the MOS transistor 6 comes into the on-state, so that the capacitor C1 is discharged by the resistor R1. Then, an inverted signal of an output signal of the voltage comparison portion 4, which is an on-duty PWM signal based on charging discharging of the capacitor C1, is supplied to the control portion 8. Based on the inverted signal of the output signal of the voltage comparison portion 4, the control portion X outputs control signals CNT1 to CNT4 that are PWM signals. That is, in the case where the switch SW1 is in the on-state and the switch SW2 is in the off-state, the control portion 8 selects the PWM current mode.

On the other hand, in a case where the switch SW1 is in the off-state and the switch SW2 is n the on-state, the multiple-output load driving device 100 comes into a DC current mode. In the DC current mode, the capacitor C1 is always charged by the battery E1, and thus a charging voltage of the capacitor C1 becomes larger than the first threshold value. Accordingly, the voltage comparison portion 4 always outputs a low-level signal. Although the MOS transistor 6 comes into the on-state, since an amount of charging of the capacitor C1 by the battery E1 is larger than an amount of discharging of the capacitor C1 by the resistor R1, the capacitor C1 is always charged as described above. Further, an inverted signal (a high-level signal) of an output signal of the voltage comparison portion 4 is supplied to the control portion. Based on the inverted signal of the output signal of the voltage comparison portion 4, the control portion 8 always outputs high-level signals as the control signals CNT1 to CNT4. That is, in the case where the switch SW1 is in the off-state and the switch SW2 is in the on-state, the control portion 8 selects the DC current mode.

In a case where the control signal CNT1 received from the control portion 8 is a PWM signal, the driving circuit 21 generates a PWM current and supplies the PWM current to the external terminal OUT1. In a case where the control signal CNT1 received from the control portion 8 is a high-level signal, the driving circuit 21 venerates a DC current and supplies the DC current to the external terminal OUT1.

In a case where the control signal CNT2 received from the control portion 8 is a PWM signal, the driving circuit 22 generates a PWM current and supplies the PWM current to the external terminal OUT2. In a case where the control signal CNT2 received from the control portion 8 is a high-level signal, the driving circuit 22 generates a DC current and supplies the DC current to the external terminal OUT2.

In a case here the control signal CNT3 received from the control portion 8 is a PWM signal, the driving circuit 23 generates a PWM current and supplies the PWM current to the external terminal OUT3. In a case where the control signal CNT3 received from the control portion 8 is a high-level signal, the driving circuit 23 generates a DC current and supplies the DC current to the external terminal OUT3.

In a case where a control signal CNT4' is a PWM signal, the driving circuit 24 generates a PWM current and supplies the PWM current to the external terminal OUT4. In a case where the control signal CNT4' is a high-level signal, the driving circuit 24 generates a DC current and supplies the DC current to the external terminal OUT4. The control signal CNT4' will be described later.

<First Switching Between Control Specifies>

The OR gate 9 outputs the control signal CNT4' that is a logical sum of the control signal CNT4 outputted from the control portion 8 and a binary signal supplied to the external terminal MSET2.

Figure 2:
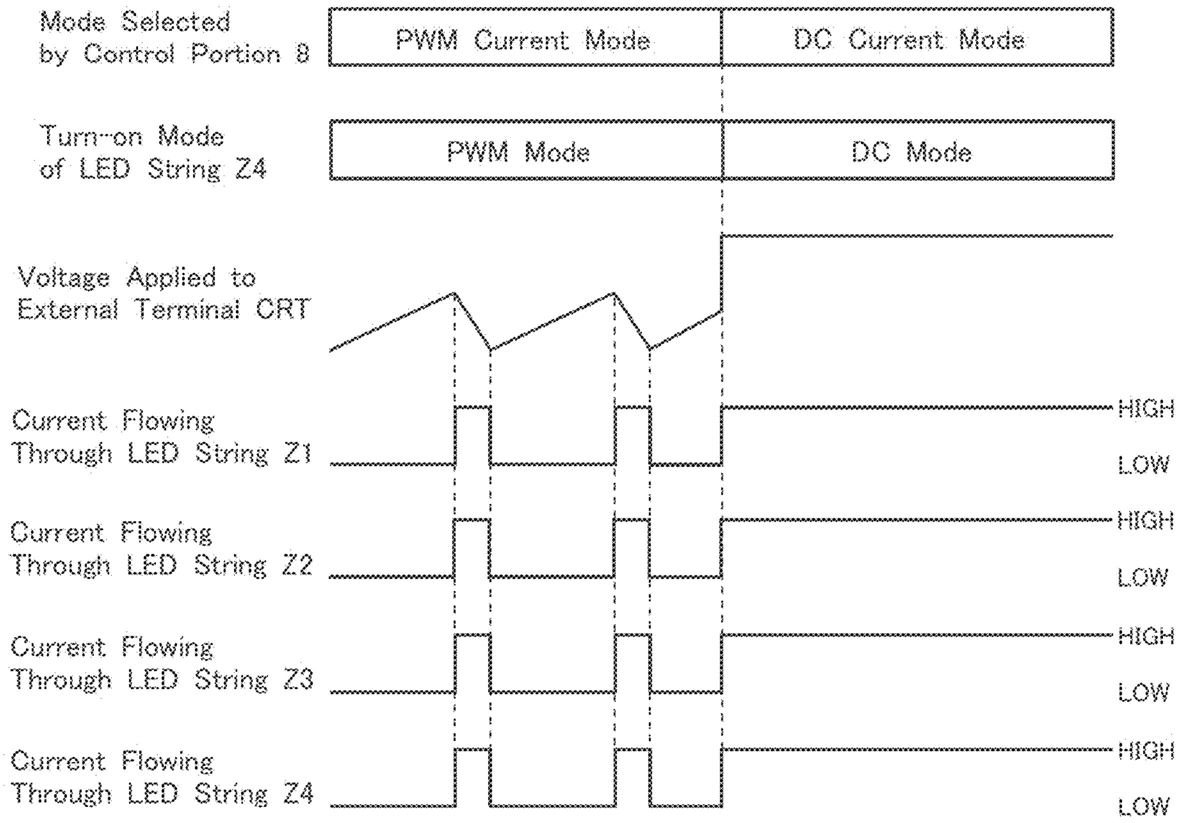
FIG. 2 is a view showing an example of a timing chart of the LED lamp module.

For example, when the external terminal MSET2 is connected to a ground end, and a low-level signal is supplied to the external terminal MSET2, the output signal CNT4' of the OR gate 9 is always equal in level to the control signal CNT4 supplied from the control portion 8 to the OR gate 9. Thus, as shown in FIG. 2, the LED string Z4 has two turn-on modes. i.e., a PWM mode and a DC mode. Specifically, when the switch SW1 is in the on-state and the switch SW2 is in the off-state, the control signal CNT4' is a PWM signal, and thus the driving circuit 24 generates a PWM current and supplies the PWM current to the external terminal OUT4. In contrast, when the switch SW1 is in the off-state and the switch SW2 is in the on-state, the control signal CNT4' is a high-level signal, and thus the driving circuit 24 generates a DC current and supplies the DC current to the external terminal OUT4.

In a case where a low-level signal is supplied to the external terminal MSET2, in each of all the LED strings Z1 to Z4, when the switch SW1 is in the off-state and the switch SW2 is in the on-state, a higher luminance is obtained than when the switch SW1 is in the on-state and the switch SW2 is in the off-state. Accordingly, for example, in a case where all the LED strings Z1 to Z4 are used as a tail lamp-cum-stop lamp, it is appropriate to supply a low-level signal to the external terminal MSET2.

Figure 3:
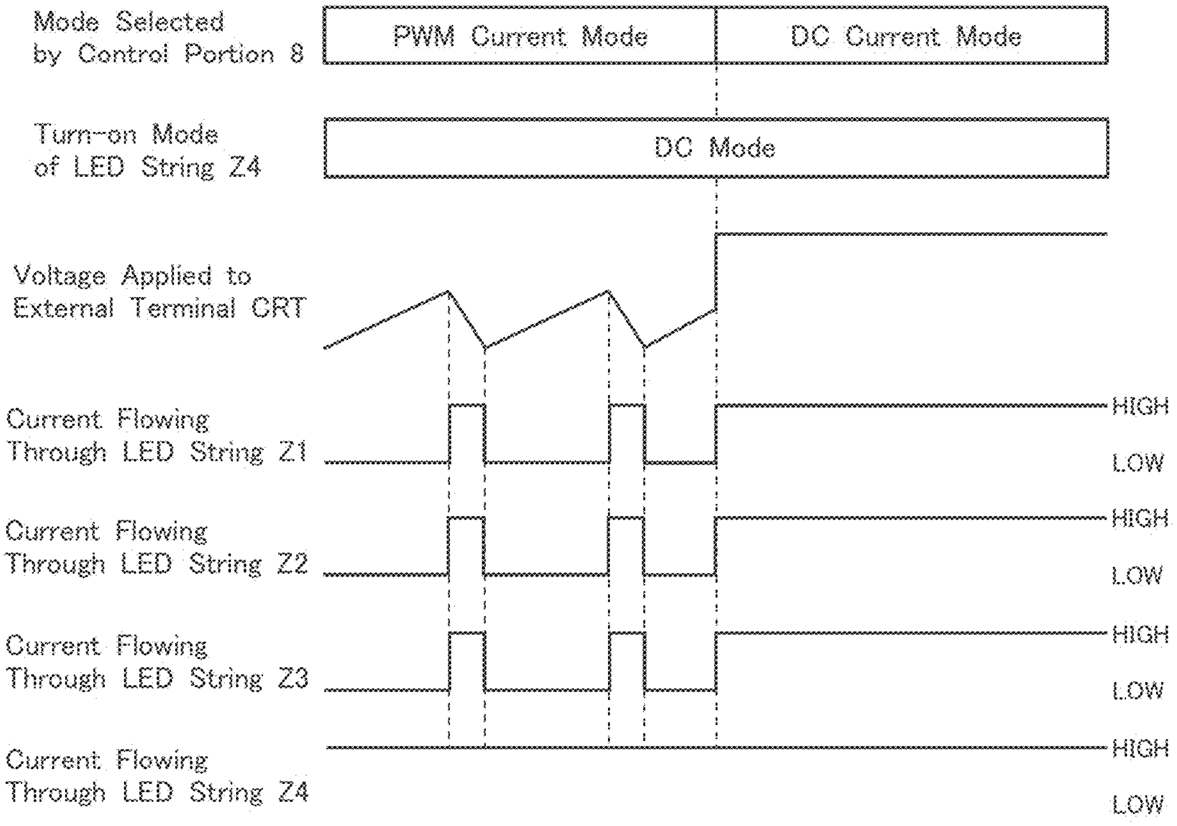
FIG. 3 is a view showing an example of the timing chart of the LED lamp module.

On the other hand, for example, when the external terminal MSET2 is pulled up by a pull-up resistor, and a high-level signal is supplied to the external terminal MSET2, the output signal CNT4' of the OR gate 9 always has a high level. Thus, as shown in FIG. 3, the LED string Z4 has only the DC mode as a turn-on mode. Specifically, in both of a case where the switch SW1 is in the on-state and the switch SW2 is in the off state and a case where the switch SW1 is in the off-state and the switch SW2 is in the on-state, the driving circuit 24 generates a DC current and supplies the DC current to the external terminal OUT4.

In a case where a high-level signal is supplied to the external terminal MSET2, in each of the LED strings Z1 to Z3, when the switch SW1 is in the off-state and the switch SW2 is in the on-state, a higher luminance is obtained than when the switch SW1 is in the on-state and the switch SW2 is in the off-state, and the LED string Z4 always has a constant luminance. Accordingly, for example, in a case where the LED strings Z1 to Z3 are used as a tail lamp-cum-stop lamp and the LED string Z4 is used as a license lamp, it is appropriate to supply a high-level signal to the external terminal MSET2. Furthermore, since it is sufficient for the license lamp to have a lower luminance than that of the tail lamp-cum-stop lamp, preferably, for example, as in this embodiment, a single LED string is used to form the license lamp, and a plurality of LED strings are used to form the tail lamp-cum-stop lamp. It is also possible to, for example, make the number of LEDs constituting each of the LED strings vary among the LED strings and to make a rank of LEDs constituting each of the LED strings vary among the LED strings. In a case of adopting such a configuration, or example, a configuration may be adopted in which, unlike in this embodiment, a plurality of LED strings are used to form the license lamp, and a single or a plurality of LED strings are used to form the tail lamp-cum-stop lamp.

Furthermore, for example, an inverter may be provided between the external terminal MSET2 and the OR gate 9. In this case, when a high-level signal is supplied to the external terminal MSET2, the output signal CNT4' of the OR gate Q is always equal in level to the control signal CNT4 supplied from the control portion 8 to the OR gate 9. In each of all the LED strings Z1 to Z4, when the switch SW1 is in the off-state and the switch SW2 is in the on-state, a higher luminance is obtained than when the switch SW1 is in the on-state and the switch SW2 is in the off-state.

<Second Switching Between Control Specifics>

The abnormality detection circuit 31 detects an abnormality in the external terminal OUT1. For example, in a case where a voltage supplied from the driving circuit 21 to the external terminal OUT1 does not fall within a predetermined normal range, the abnormality detection circuit 31 detects an abnormality in the external terminal OUT1. The abnormality detection circuit 31 outputs a low-level signal upon having detected an abnormality and outputs a high-level signal upon-having not detected an abnormality.

The abnormality detection circuits 32 to 34 are different from the abnormality detection circuit 31 in that they detect abnormalities in the external terminals OUT2 to OUT4, respectively, whereas a circuit configuration itself of each of the abnormality detection circuits 32 to 34 is similar to that of the abnormality detection circuit 31.

The switch 10 is provided between the abnormality detection circuit 34 and the AND gate 11. The switch 10 is controlled by a binary signal supplied to the external terminal MSET2.

Figure 4:
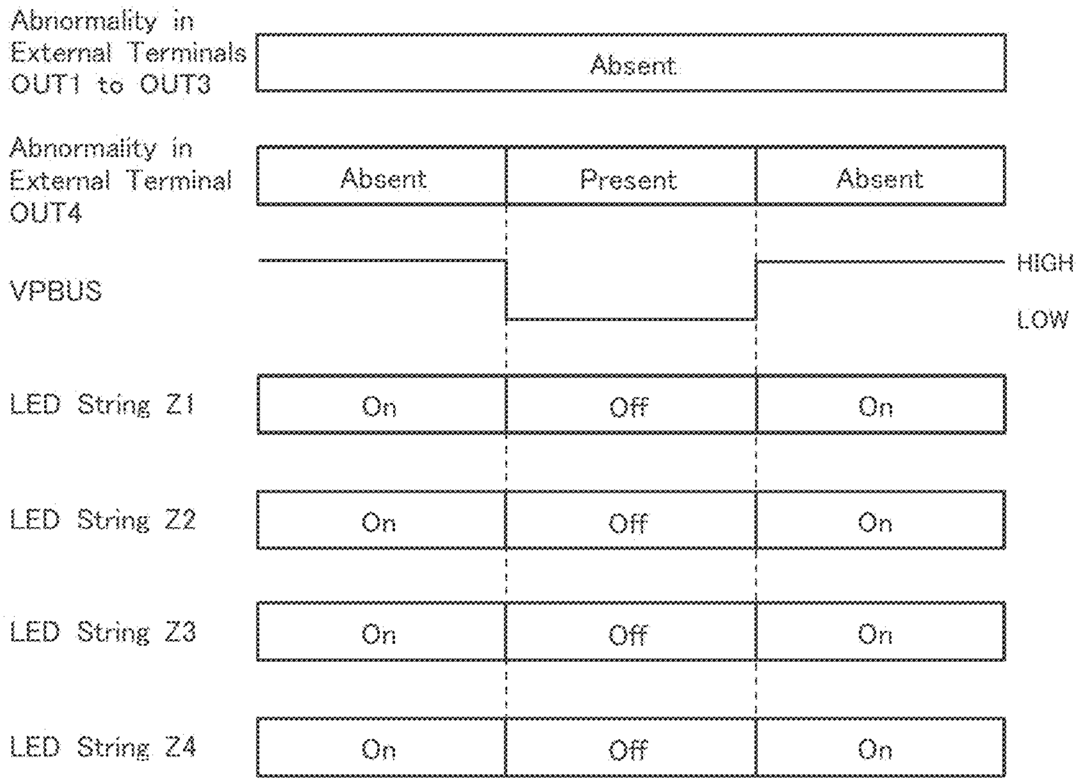
FIG. 4 is a view showing an example of the timing chart of the LED lamp module.

For example, when the external terminal MSET2 is connected to the ground end, and a low-level signal is supplied to the external terminal MSET2, the switch 10 comes into the on-state. Thus, the AND gate 11 supplies, to the external terminal PBUS, an abnormality flag signal VPBUS that is a logical product of respective output signals of the abnormality detection circuits 31 to 34. Furthermore, in a case where the switch 12 is in the on-state, the AND gate 11 supplies, also to each of the driving circuits 21 to 24, the abnormality flag signal VPBUS that is a logical product of respective output signals of the abnormality detection circuits 31 to 34. Thus, as shown in FIG. 4, when the abnormality detection portion 34 has detected an abnormality in the external terminal OUT4, the abnormality flag signal VPBUS has a low level indicative of an abnormal state. Furthermore, in the case where the switch 12 is in the on-state, as shown in FIG. 4, when the abnormality detection portion 34 has detected an abnormality in the external terminal OUT4, each of the driving circuits 21 to 24 receives the abnormality flag signal VPBUS (a signal indicative of the abnormal state) having a low level and stops producing an output, based on the abnormality flag signal VPBUS (the signal indicative of the abnormal state) having a low level.

Upon a low-level signal being supplied to the external terminal MSET2, when an abnormality has occurred in at least one of the external terminals OUT1 to OUT4, all the external terminals OUT1 to OUT4 can be stopped from producing outputs. Accordingly, for example, in a case where all the LED strings Z to Z4 are used as a tail lamp-cum-stop lamp, it is appropriate to supply a low-level signal to the external terminal MSET2.

Figure 5:
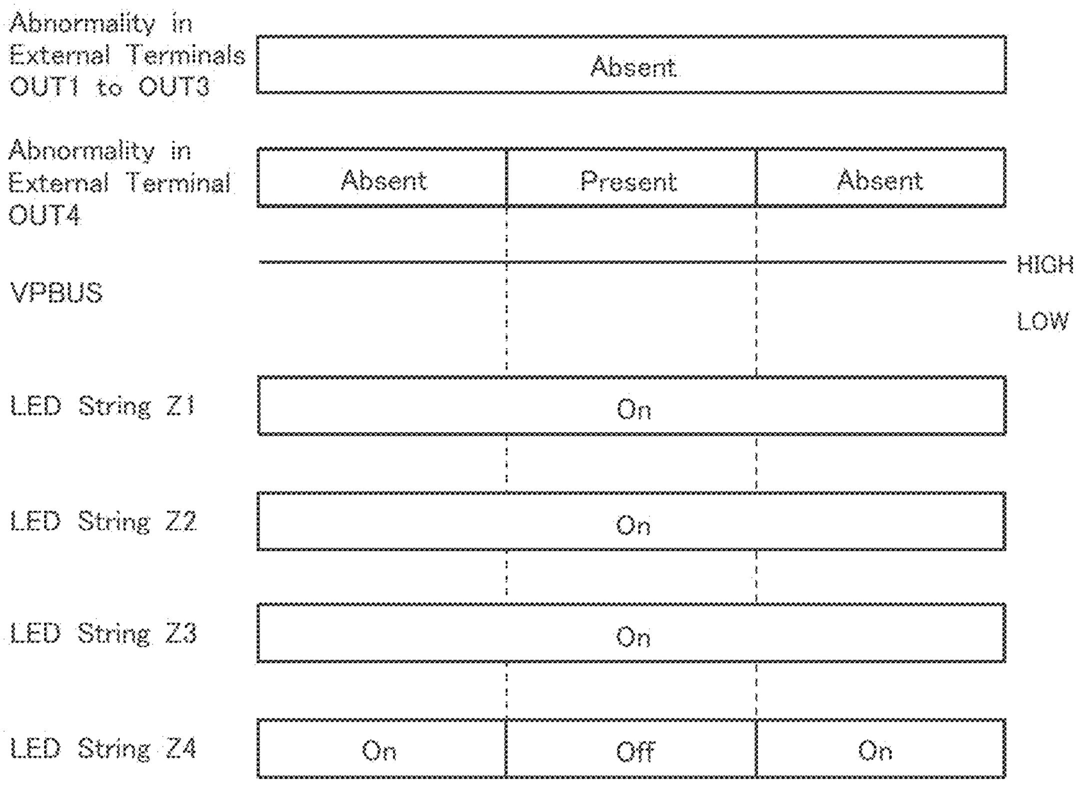
FIG. 5 is a view showing an example of the timing chart of the LED lamp module.

On the other hand, for example, when the external terminal MSET2 is pulled up by a pull-up resistor, and a high-level signal is supplied to the external terminal MSET2, the switch 10 comes into the off-state. Thus, the AND gate 11 supplies, to the external terminal PBUS, the abnormality flag signal VPBUS that is a logical product of respective output signals of the abnormality detection circuits 31 to 33. Furthermore, in a case where the switch 12 is in the on-state, the AND gate 11 supplies, also to each of the driving circuits 21 to 23, the abnormality flag signal VPBUS that is a logical product of respective output signals of the abnormality detection circuits 31 to 33. Thus, as shown in FIG. 5, even when the abnormality detection portion 34 has detected an abnormality in the external terminal OUT4, the abnormality lag signal VPBUS has a high level indicative of a normal state. Furthermore, in the case where the switch 12 is in the on-state, as shown in FIG. 5, even when the abnormality detection portion 34 has detected an abnormality in the external terminal OUT4, each of the driving circuits 21 to 24 receives the abnormality lag signal VPBUS (a signal indicative of the normal state) having a high level and does not stop producing an output, based on the abnormality hag signal VPBUS (the signal indicative of the normal state) having a high level.

When a high-level signal is supplied to the external terminal MSET2, even when an abnormality has occurred in the external terminal OUT4, each of the external terminals OUT1 to OUT3 does not stop producing an output. Accordingly, for example, in a case where the LED strings Z1 to Z3 are used as a tail lamp-cum-stop lamp and the LED string Z4 is used as a license lamp, it is appropriate to supply a high-level signal to the external terminal MSET2. This can provide a specification in which, even when an abnormality has occurred in the license lamp, the tail lamp-cum-stop lamp is prevented from being turned off.

Furthermore, for example, an inverter may be provided between the external terminal MSET2 and the OR gate 9. Furthermore, for example, a configuration may be adopted in which no inverter is provided between the external terminal MSET2 and the OR gate 9, and in place of the switch 10, a switch is provided that comes into the on-state when a high-level signal is supplied to the external terminal MSET2 and comes into the off-state when a low-level signal is supplied to the external terminal MSET2. In these cases, upon a high-level signal being supplied to the external terminal MSET2, when an abnormality has occurred in at least one of the external terminals OUT1 to OUT4, all the external terminals OUT1 to OUT4 can be stopped from producing an output.

While in <First Switching Between Control Specifics> and <Second Switching Between Control Specifics> described above, control specifics are switched based on a level of a signal supplied to the external terminal MSET2, for example, a configuration may also be adopted in which another external terminal MSET3 is provided, and control specifics are switched based on a level of a signal supplied to the external terminal MSET2 in <First Switching Between Control Specifics> described above and based on a level of a signal supplied to the other external terminal MSET3 in <Second Switching Between Control Specifics> described above.

In considering, however, switching between a specification in which the LED string Z4 is used as a license lamp and a specification in which the LED string Z4 is not used as a license lamp, it is preferable to enable both of <First Switching Between Control Specifics> and <Second Switching Between Control Specifics> described above. From the viewpoint of reducing the number of external terminals used, it is preferable to switch control specifics based on a level of a signal supplied to the external terminal MSET2 in both of <First Switching Between Control Specifics> and <Second Switching Between Control Specifics> described above.

<Third Switching Between Control Specifics>

The swatch 12 is provided between an output terminal of the AND gate 11 and the driving circuits 21 to 24. The switch 12 is controlled by a binary signal supplied to the external terminal MSET1.

Figure 6:
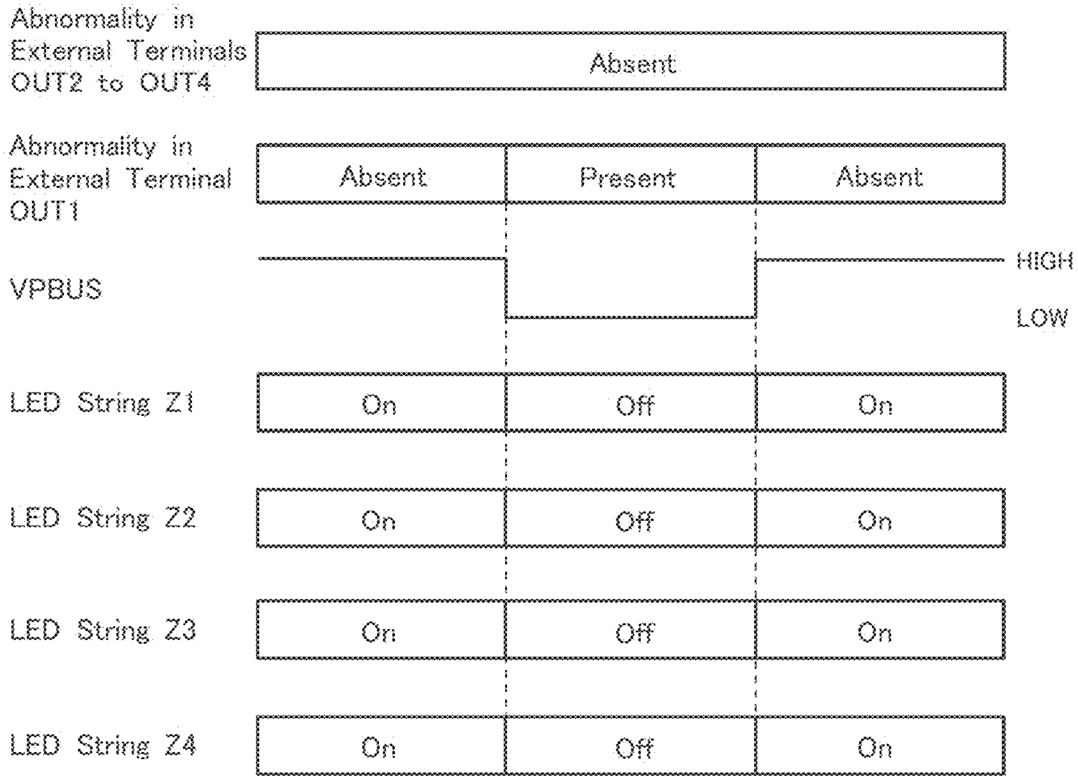
FIG. 6 is a view showing an example of the timing chart of the LED lamp module.

For example, when the external terminal MSET1 is connected to a ground end, and a low-level signal is supplied to the external terminal MSET1, the switch 12 comes into the on-state. Thus, in a case where the switch 11 is in the on-state, the abnormality hag signal VPBUS that is a logical product of respective output signals of the abnormality detection circuits 31 to 34 is supplied to each of the external terminal PBUS and the driving circuits 21 to 24. Thus, when at least one of the abnormality detection portions 31 to 34 has detected an abnormality, the abnormality lag signal VPBUS has a low level indicative of the abnormal state, and each of the driving circuits 21 to 24 receives the abnormality flag signal VPBUS (a signal indicative of the abnormal state) having a low level and stops producing an output, based on the abnormality hag signal VPBUS (the signal indicative of the abnormal state) having a low level. Accordingly, as shown in FIG. 6, during a period of time in which the abnormality flag signal VPBUS has a low level indicative of the abnormal state, all the LED strings Z1 to Z4 are turned off.

Figure 7:
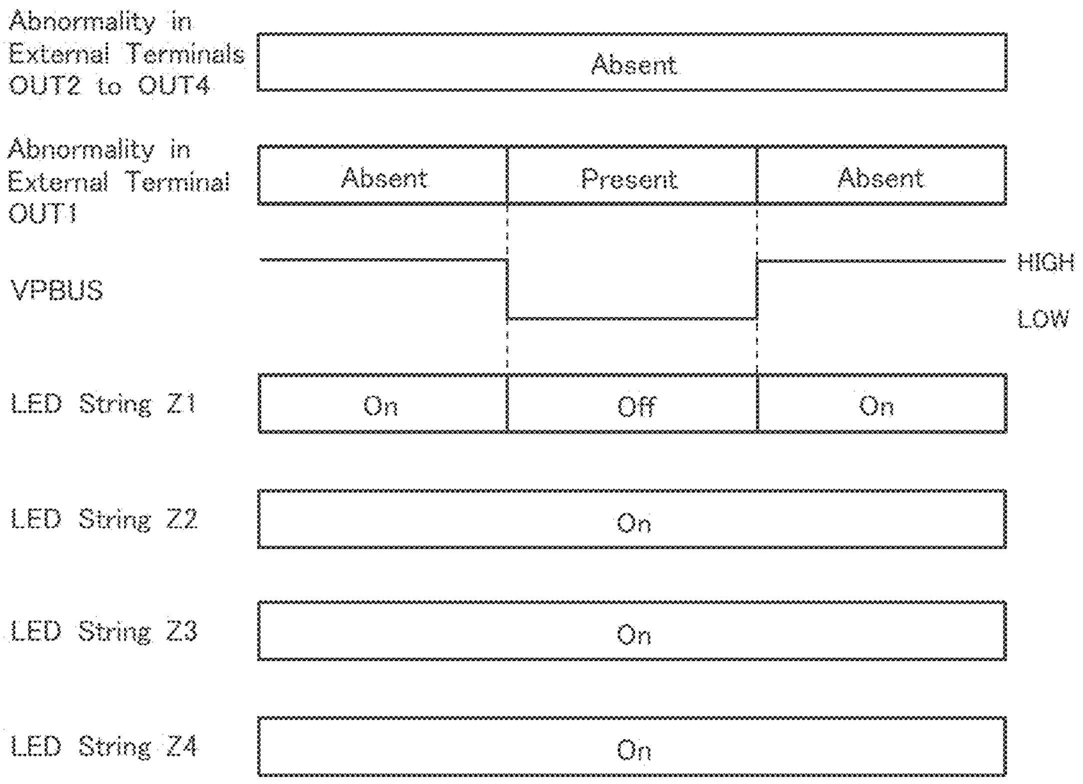
FIG. 7 is a view showing an example of the timing chart of the LED lamp-module.

On the other hand, for example, when the external terminal MSET1 is pulled up by a pull-up resistor, and a high-level signal is supplied to the external terminal MSET1, the switch 12 comes into the off state. Thus, in a case where the switch 10 is in the on-state, the abnormality flag signal VPBUS that is a logical product of respective output signals of the abnormality detection circuits 31 to 34 is supplied to the external terminal PBUS but not to each of the driving circuits 21 to 24. Thus, for example, even when the abnormality detection portion 31 has detected an abnormality in the external terminal OUT1 each of the driving circuits 21 to 24 does not receive the abnormality flag signal VPBUS (a signal indicative of the abnormal state) having a low level and thus does not stop producing an output. Accordingly, as shown in FIG. 7, during a period of time in which the abnormality detection circuit 31 has detected an abnormality and thus the abnormality flag signal VPBUS has a low level indicative of the abnormal state, only the LED string Z1 in which the abnormality has occurred is turned off, and the other LED strings Z2 to Z4 are turned on.

Figure 8:
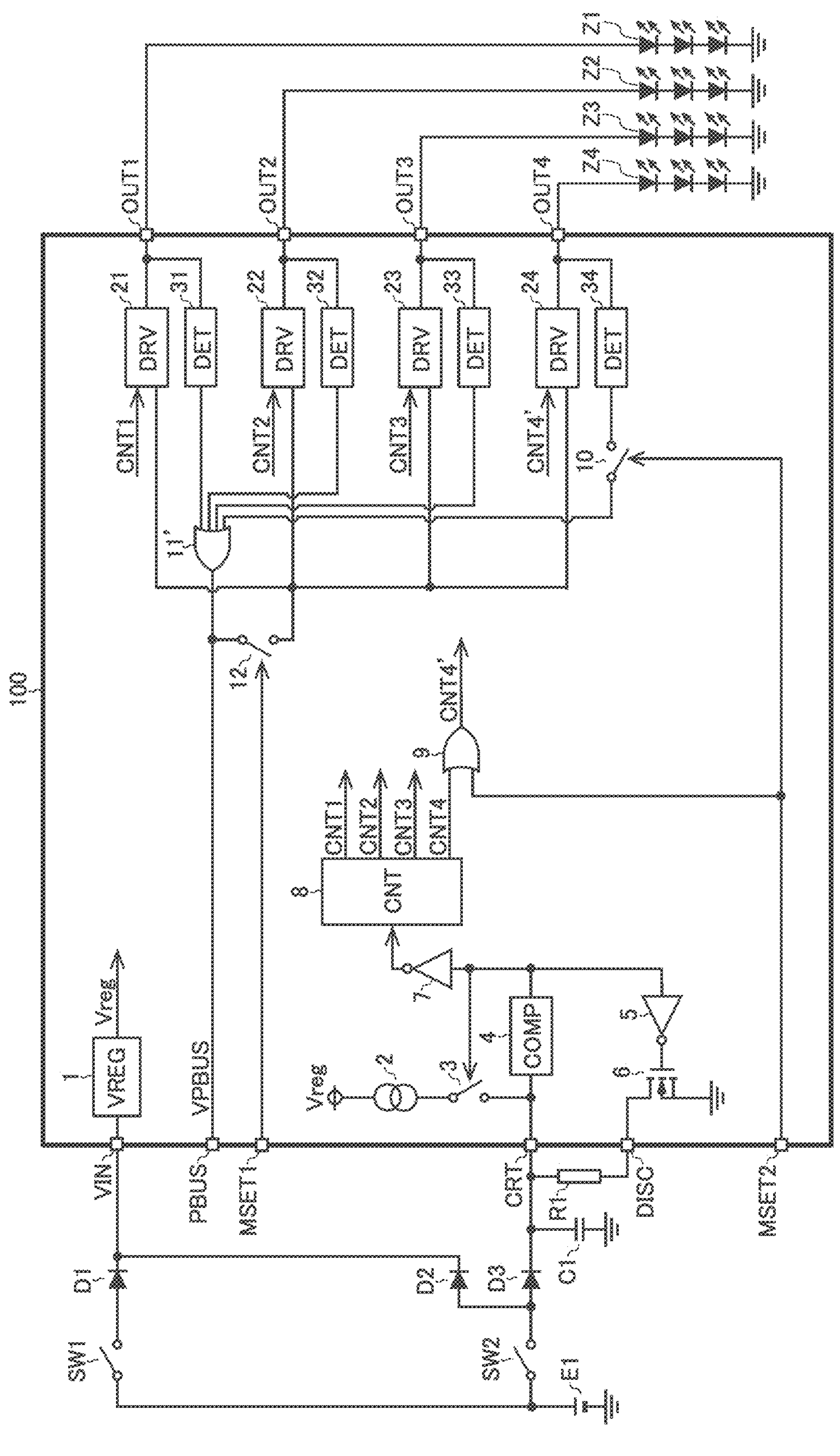
FIG. 8 is a view showing a modification example of a multiple-output load driving device.

While in this embodiment, the abnormality flag signal VPBUS is a signal that is indicative of the abnormal state when at a low level and indicative of the normal state when at a high level, by replacing the AND gate 11 with an OR gate 11' as shown in FIG. 8, it is possible to obtain, as the abnormality flag signal VPBUS, a signal that is indicative of the abnormal state when at a high level and indicative of the normal state when at a low level.

<Disposition of External Terminals in Multiple-Output Load Driving Device>

Figure 9A:
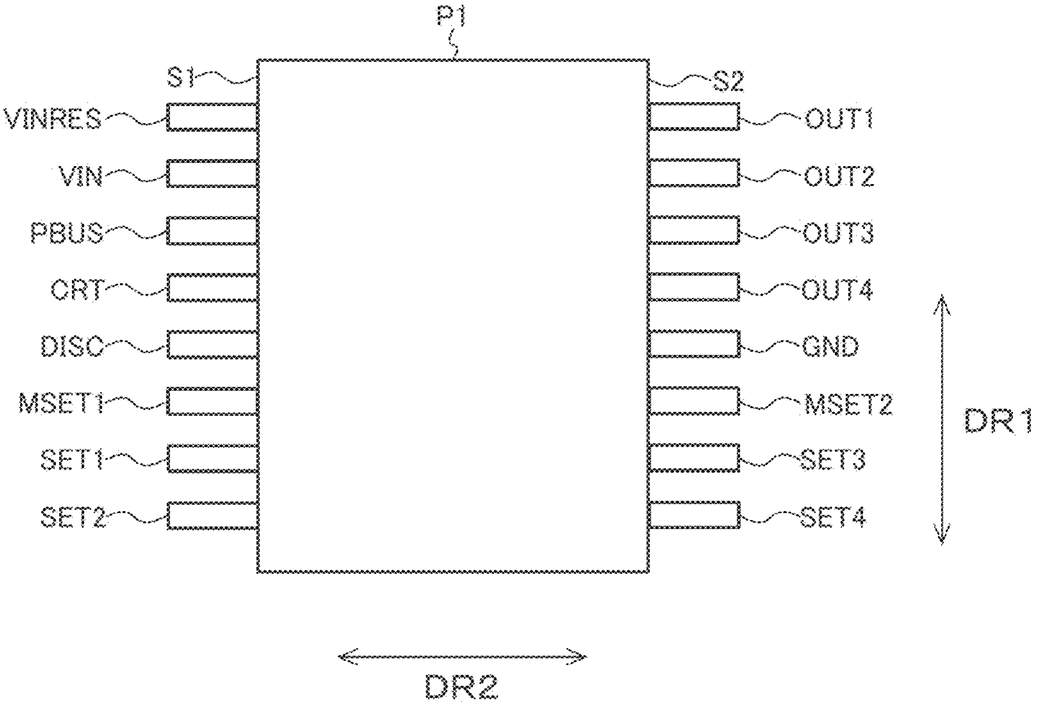
FIG. 9A is an external top view of the multiple-output load driving device.

FIG. 9A is an external top view of the multiple-output load driving device 100, showing an example of how the external terminals are disposed in the multiple-output load driving device 100. In FIG. 9A, parts identical to those shown in FIG. 1 are denoted by identical reference symbols.

A first side S1 and a second side S2 of a rectangular package P1 are substantially parallel to a First direction DR1 and substantially orthogonal to a second direction DR2.

An external terminal VINRES, the external terminal VIN, the external terminal PBUS, the external terminal CRT, the external terminal DISC, the external terminal MSET1, an external terminal SET1, and an external terminal SET2 are arranged in this order along the first side S1 of the rectangular package P1. The external terminal VINRES is a terminal to which connected is an external resistor that intentionally causes a loss of pan of excess power. The external terminal SET1 is a terminal for setting a value of an output current outputted from the external terminal OUT1. The external terminal SET2 is a terminal for setting a value of an output current outputted from the external terminal OUT2.

The external terminal VINRES, the external terminal VIN, the external terminal PBUS, the external terminal CRT, and the external terminal DISC are each a high-withstand-voltage terminal, and the external terminal SET1 and the external terminal SET2 are each a low-withstand-voltage terminal (for example, a 5-V terminal) having a withstand voltage lower than that of the high-withstand-voltage terminal. The external terminal MSET1 that is an input terminal having a withstand voltage higher than that of the low-withstand-voltage terminal is provided between the external terminal DISC that is the high-withstand-voltage terminal and the external terminal SET1 that is the low-withstand-voltage terminal, and thus even when a short circuit occurs between the external terminal MSET1 and each of adjacent external terminals on both sides thereof (the external terminal DISC and the external terminal SET1), no withstand voltage breakdown occurs in the external terminal SET1.

Figure 9B:
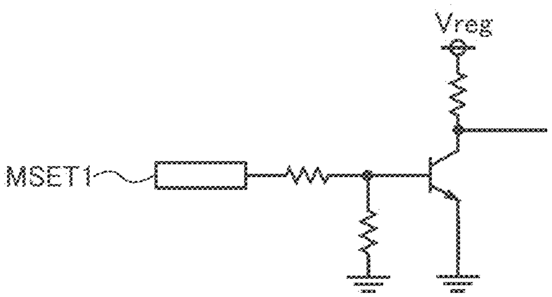
FIG. 9B is a view showing a discrete circuit connected to an external terminal.

For example, as shown in FIG. 9B, inside the multiple-output load driving device 100, a base of a bipolar transistor Q1 is connected to the external terminal MSET1 via a resistor, and thus the external terminal MSET1 can be configured as an input terminal having a high withstand voltage.

Furthermore, the external terminal OUT1, the external terminal OUT2, the external terminal OUT3, the external terminal OUT4, an external terminal GND, the external terminal MSET2, an external terminal SET3, and an external terminal SET4 are arranged in this order along the second side S2 of the rectangular package P1 that is opposite to the first side S1. The external terminal GND is connected to aground end. The external terminal SET3 is a terminal for setting a value of an output current outputted from the external terminal OUT3. The external terminal SET4 is a terminal for setting a value of an output current outputted from the external terminal OUT4.

The external terminal SET3 and the external terminal SET4 are each the low-withstand-voltage terminal (for example, a 5-V terminal) having a withstand voltage lower than that of the high-withstand-voltage terminal. The external terminal MSET 2 that is an input terminal having a withstand voltage higher than that of the low-withstand-voltage terminal is provided between the external terminal GND and the external terminal SET3 that is the low-withstand-voltage terminal.

In FIG. 9A, the external terminals are shown to be disposed in the following manner. That is, the external terminal VINRES, the external terminal VIN, the external terminal CRT, and the like that are external terminals to each of which a high voltage is inputted (high-voltage input terminals) are disposed so as to avoid being positioned adjacently to the external terminals OUT1 to OUT4, respectively, which are connected to loads. This prevents a short circuit from occurring between any of the high-voltage input terminals and an adjacent one of the external terminals OUT1 to OUT4 and thus causing a breakdown of one of the loads connected to the adjacent one of the external terminals OUT1 to OUT4. The external terminal MSET1 and the external terminal MSET2 may be switched in position.

<Power Control Section>

The multiple-output load driving device 100 in which the external terminals are disposed as shown in, for example, FIG. 9A includes a power control section. The following describes the power control section in a case, as an example, where the external terminals are disposed as shown in FIG. 9A.

The above-described power control section has a function in which at a rise of an input voltage Vin inputted to the external terminal VIN, part of excess power, which would conventionally be consumed inside the device, is intentionally lost by an external resistor provided outside the device (on an input side).

By adopting the power control section, it is possible to always maintain power consumption inside the device at a predetermined upper limit value or less, thus making it possible to suppress heat generation by the multiple-output load driving device 100. Accordingly, a sufficient margin is provided in allowable power dissipation of the multiple-output load driving device 100, and thus an area of a printed wiring board on which the multiple-output load driving device 100 is mounted is no longer required to be needlessly increased, so that incorporation into a small-sized module is also facilitated.

Furthermore, an input dynamic range of the multiple-output load driving device 100 (=a range of inputtable values of the input voltage Vin) is expanded, and thus, for example, even a battery whose input voltage Vin is unstable can be used as the power source E1.

Furthermore, with the multiple-output load driving device IM according to this configuration example, no excess power is applied inside the device, and thus it is possible to reduce stress applied to internal elements and thus to contribute to an improvement in reliability and an increase in product service life.

Compared with the multiple-output load driving device 100 that is a semiconductor element, the external resistor that is a discrete element has higher thermal tolerance, thus causing no particular trouble even when generating some heat.

The above-described power control section includes a current distribution portion and a distribution control portion. The above-described current distribution portion adds together a first input current accepted by the external terminal VIN and a second input current accepted by the external terminal VINRES at a predetermined distribution ratio so as to generate a driving current. The above-described distribution control portion controls the above-described distribution ratio.

For example, based on a control signal Sc from the above-described distribution control portion, the above-described current distribution portion adds together a first input current lin1 and a second input current lin2 at the predetermined distribution ratio so as to generate a driving current.

The above-described distribution control portion continuously detects a difference value Vx−Vy (corresponding to a voltage drop between an input terminal and an output terminal) between a first terminal voltage Vx appearing in the external terminal VINRES and a second terminal voltage Vy based on a voltage appearing in each of the external terminals OUT1 to OUT4 and generates the control signal Sc so that a detected value of the difference value Vx−Vy does not exceed a predetermined upper limit value, thus dynamically controlling the above-described distribution ratio. Specifically speaking, until the difference value Vx−Vy reaches the predetermined upper limit value, basically, only the first input current lin1 is made to flow, and the second input current lin2 is interrupted, and after the difference value Vx−Vy has reached the predetermined upper limit value, the above-described distribution ratio is automatically and smoothly adjusted so that the first input current lin1 is decreased and the second input current lin2 is increased. It is also possible not to detect the second terminal voltage Vy.

The control portion 8 performs constant current control of the above-described driving current. That is, the control portion 8 performs output feedback control of the above-described driving current so that the driving current always has a constant value regardless of the input voltage Vin applied to the external terminal VIN. The above-described driving current is equal to a sum of output currents outputted from the external terminals OUT1 to OUT4, respectively.

Figure 10:
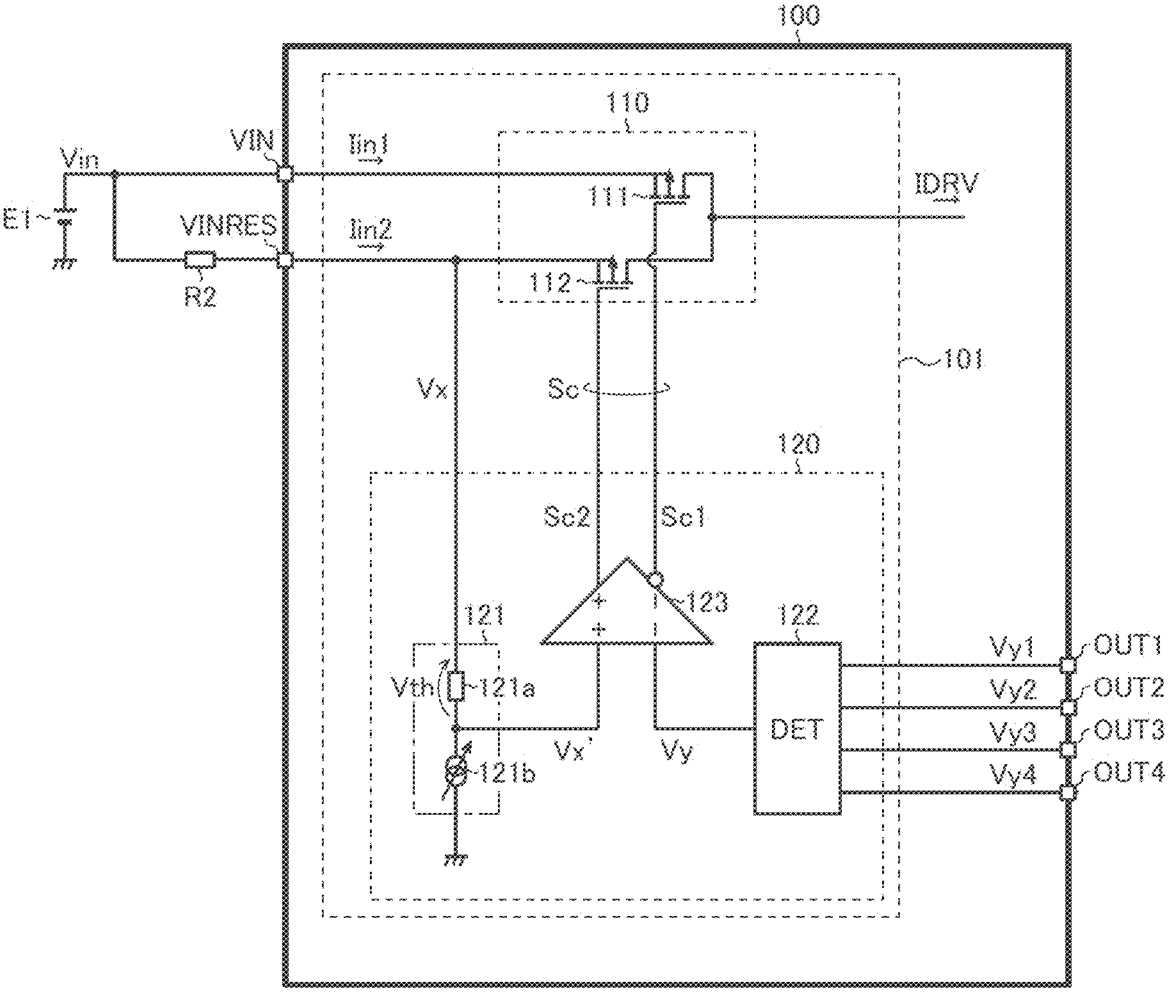
FIG. 10 is a view showing a configuration example of a power control section.

FIG. 10 is a view showing a configuration example of the above-described power control section. In FIG. 10, while the multiple-output load driving device 100 is shown, parts thereof other than those necessary for describing the above-described power control section are not depicted.

A power control section 101 includes a current distribution portion 110 and a distribution control portion 120.

First, a description is given of the current distribution portion 110. The current distribution portion 110 includes P-channel MOS (metal oxide semiconductor) field-effect transistors 111 and 112 as units that dynamically perform differential control of the distribution ratio between the first input current lint and the second input current lin2. The transistor 111 corresponds to a first transistor that is provided in a path through which the first input current lin1 flows (=a direct path). On the other hand, the transistor 112 corresponds to a second transistor that is provided in a path through which the second input current lin2 flows (=a loss path).

A description is specifically given of a relationship of connection between the transistor 111 and the transistor 112. A source and a back gate of the transistor 111 are connected to the external terminal VIN (=an input end of the first input current lin1). A source and a back gate of the transistor 112 are connected to the external terminal VINRES (=an input end of the second input current lin2). Drains of the transistors 111 and 112 are connected to each other, and a connection node between them is connected as an output end of a driving current IDRV to each of input ends of the driving circuits 21 to 24 (not shown in FIG. 10) at a downstream stage.

Furthermore, a first control signal Sc1 is being inputted to a gate of the transistor 111. Accordingly, the higher the first control signal Sc1, the larger an on-resistance value of the transistor 111, so that the first input current Iin1 is decreased. Conversely, the lower the first control signal Sc1, the smaller the on-resistance value of the transistor 111, so that the first input current Iin1 is increased.

On the other hand, a second control signal Sc2 is being inputted to a gate of the transistor 112. Accordingly, the higher the second control signal Sc2, the larger an on-resistance value of the transistor 112, so that the second input current Iin2 is decreased. Conversely, the lower the second control signal Sc2, the smaller the on-resistance value of the transistor 112, so that the second input current Iin2 is increased.

A voltage clamping element may be connected between the gate and the source of each of the transistors 111 and 112.

Next, a description is given of the distribution control portion 120. The distribution control portion 120 includes an input detection part 121, an output detection part 122, and a differential amplifier 123. The distribution control portion 120 generates, as the previously described control signal Sc, the first control signal Sc1 and the second control signal Sc2, thus dynamically performing differential control of the on-resistance values of the transistors 111 and 112.

The input detection part 121 includes a resistor 121*a* and a current source 121*b* that are connected in series between a second input terminal IN2 and a ground end. The input detection part 121 generates a first differential input voltage Vx' (=Vx−Vth) obtained by subtracting a predetermined threshold voltage Vth (=a voltage across the resistor 121*a*) from the first terminal voltage Vx appearing in the external terminal VINRES. It is desirable to use, for example, a variable current source as the current source 121*b* so that the threshold voltage Vth can be freely adjusted.

The output detection part 122 generates the second differential input voltage Vy from voltages Vy1 to Vy4 appearing in the output terminals OUT1 to OUT 4, respectively. The voltages Vy1 to Vy4 are determined by forward drop voltages of the LED strings Z1 to Z4 (not shown in FIG. 10), respectively.

For example, the output detection part 122 could be configured to output, as the second differential input voltage Vy, a maximum value of values of the second terminal voltages Vy1 to Vy4. With this configuration, until the first differential input voltage Vx' reaches the maximum value of values of the voltages Vy1 to Vy4, the previously described function of dispersing power consumption is not exerted. Accordingly, even when there are variations in number of series stages of LEDs or forward drop voltage among the LED strings Z1 to Z4, all the LED strings Z1 to Z4*s* can be turned on reliably.

Furthermore, for example, the output detection part 122 may be configured to output, as the second differential input voltage Vy, an average value of values of the voltages Vy1 to Vy4. With this configuration, at a point in time when the first differential input voltage Vx' reaches the average value of values of the second terminal voltages Vy1 to Vy4, the previously described function of dispersing power consumption starts to be exerted. Accordingly, even when there are variations in number of series stages of the LEDs or forward drop voltage among the LED strings Z1 to Z4, an excessive voltage is unlikely to be applied to each of the LED strings Z1 to Z4.

Based on a difference value Vx'−Vy between the first differential input voltage Vx' inputted to a non-inverted input end (+) and the second differential input voltage Vy inputted to an inverted input end (−), the differential amplifier 123 generates the first control signal Sc1 and the second control signal Sc2. An electrostatic protection element may be connected to an input stage of the differential amplifier 123.

A description is specifically given of an operation of the differential amplifier 123. Where Vx'−Vy≤0 (i.e., Vx−Vy≤Vth), the first control signal Sc1 outputted from an inverted output end (−) of the differential amplifier 123 is stuck at a low level, and the second control signal Sc2 outputted from a non-inverted output end (+) of the differential amplifier 123 is stuck at a high level. Accordingly, the current distribution portion 110 comes into a state where the transistor 111 is fully turned on and the transistor 112 is fully turned oft, namely, a state where only the first input current Iin1 in the direct path is made to flow and the second input current Iin2 in the loss path is interrupted.

On the other hand, where Vx'−Vy>0 (i.e., Vx−Vy>Vth), the first control signal Sc1 that has been stuck at a low level rises, and the second control signal Sc2 that has been stuck at a high level falls, so that the on-resistance value of the transistor 111 is raised from a minimum value, and the on-resistance value of the transistor 112 is reduced from a maximum value. As a result, in the current distribution portion 110, the distribution ratio between the first input current Iin1 and the second input current Iin2 is automatically and smoothly adjusted so that the first input current Iin1 is decreased and the second input current Iin2 is increased.

As described above, in the distribution control portion 120, based on the difference value Vx−Vy between the first terminal voltage Vx and the second terminal voltage Vy, differential control of the distribution ratio between the first input current Iin1 and the second input current Iin2 is dynamically performed.

<Chip Layout>

Figure 11:
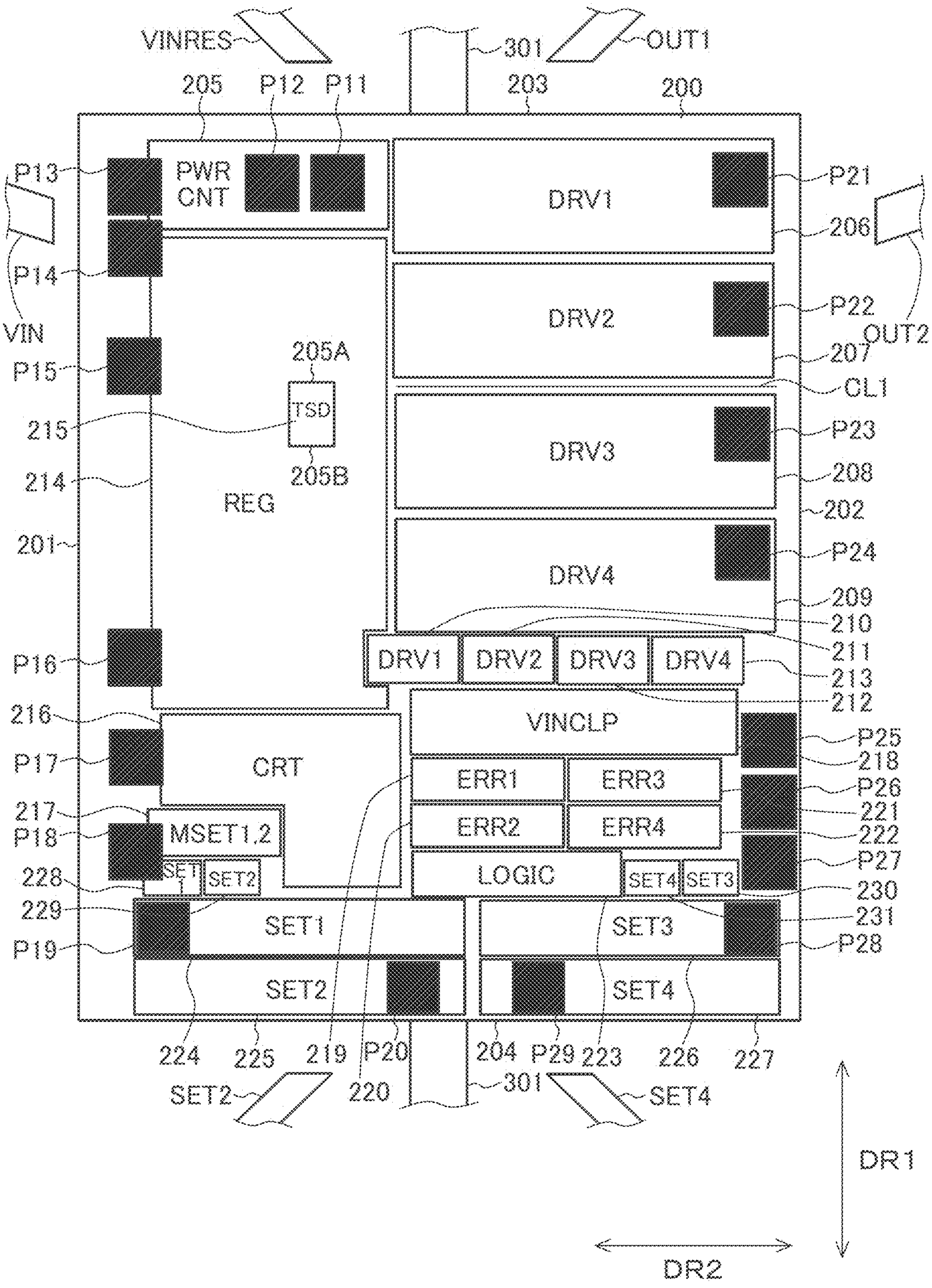
FIG. 11 is a view showing a layout example of a semiconductor chip sealed in the multiple-output load driving device.

FIG. 11 is a view showing a layout example of a semiconductor chip sealed in the multiple-output load driving device 100. A semiconductor chip 200 is a member cut out in a rectangular shape in a plan view thereof.

In the following description, on a plane of the drawing, among four sides forming an outer circumference of the semiconductor chip 200, a left one is defined as a first side 201, a right one opposite to the first side 201 as a second side 202, an upper one as a third side 203, and a lower one opposite to the third side 203 as a fourth side 204. Similarly to the first side S1 and the second side S2 of the rectangular package P1, the first side 201 and the second side 202 are substantially parallel to the first direction DR1 and substantially orthogonal to the second direction DR2.

The semiconductor chip 20) is supported by an island 301. The semiconductor chip 200 includes pads P11 to P29.

The pads P11 and P12 are wire-bonded to the external terminal VINRES. The pads P13 and P14 are wire-bonded to the external terminal VIN. The pad P15 is wire-bonded to the external terminal PBUS. The pad P16 is wire-bonded to the external terminal CRT. The pad P17 is wire-bonded to the external terminal DISC. The pad P18 is wire-bonded to the external terminal MSET1. The pad P19 is wire-bonded to the external terminal SET1. The pad P20 is wire-bonded to the external terminal SET2.

A distance between an end of the external terminal VINRES and the second side 202 in the second direction DR2 is shorter than a distance between the first side 201 and the second side 202 in the second direction DR2. Similarly, a distance between an end of the external terminal SET2 and the second side 202 in the second direction DR2 is shorter than a distance between the first side 201 and the second side 202 in the second direction DR2. On the other hand, a distance between an end of the external terminal VIN and the second side 202 in the second direction DR2 is longer than a distance between the first side 201 and the second side 202 in the second direction DR2. Though not shown in FIG. 11, the same as the external terminal VIN applies also to the external terminal PBUS, the external terminal CRT, the external terminal DISC, the external terminal MSET1, and the external terminal SET1.

A distance between an end of the external terminal OUT1 and the first side 201 in the second direction DR2 is shorter than a distance between the first side 201 and the second side 202 in the second direction DR2. Similarly, a distance between an end of the external terminal SET4 and the first side 201 in the second direction DR2 is shorter than a distance between the first side 201 and the second side 202 in the second direction DR2. On the other hand, a distance between an end of the external terminal OUT2 and the first side 201 in the second direction DR2 is longer than a distance between the first side 201 and the second side 202 in the second direction DR2. Though not shown in FIG. 11, the same as the external terminal VOUT2 applies also to the external terminal OUT3, the external terminal OUT4, the external terminal GND, the external terminal MSET2, and the external terminal SET31.

The pads P21 to P24 are wire-bonded to the external terminals OUT1 to OUT4, respectively. The pads P25 and P26 are wire-bonded to the external terminal GND. The pad P27 is wire-bonded to the external terminal MSET2. The pad P28 is wire-bonded to the external terminal SET3. The pad P29 is wire-bonded to the external terminal SET4.

In this layout, in the plan view of the semiconductor chip 20, a disposition region 205 of the power control section 101 is located near the first side 201 of the semiconductor chip 200 (=closer to the first side 201 with respect to disposition regions 206 to 209 of main bodies of the driving circuits 21 to 24).

On the other hand, in this layout, in the plan view of the semiconductor chip 200, the disposition regions 20 to 209 of the main bodies of the driving circuits 21 to 24 are located near the second side 202 of the semiconductor chip 200 (=closer to the second side 202 with respect to the disposition region 205 of the power control section 101).

That is, when viewed from the first direction DR1, the disposition region 205 of the power control section 101 does not overlap with the disposition regions 206 to 209 of the main bodies of the driving circuits 21 to 24.

Further, the disposition region 205 of the power control section 101 is located at an end of the semiconductor chip 200 in the first direction DR1. The power control section 101 is a circuit through which a largest current flows and thus has a thick wire. With the disposition region 205 of the power control section 101 provided at the end of the semiconductor chip 200 in the first direction DR1, the wire of the power control section 101 can be prevented from interfering with disposition of any other circuit.

The disposition regions 206 to 209 of the main bodies of the driving circuits 21 to 24 are arranged along the first direction DR1 and overlap with each other as viewed from the first direction DR1. Similarly, the pads P21 to P24 are arranged along the first direction DR1 and overlap with each other as viewed from the first direction DR1. This way of disposing them can suppress the occurrence of variations in characteristics among a plurality of output systems.

From the viewpoint of reducing a length of wire bonding, the pads P11, P12, and P12 are disposed so as not to overlap with the pads P13 to P19 in the first direction, and the pad P29 is also disposed so as not to overlap with the pads P22 to P28 in the first direction. As for the pad P21, however, a higher priority is given to suppressing, as described above, variations in characteristics among a plurality of output systems rather than to reducing a length of wire bonding. For this reason, as described above, the pads P21 to P24 are arranged along the first direction DR1 and overlap with each other as viewed from the first direction DR1.

The multiple-output load driving device 100 to which this layout is applied includes an overheat protection portion. A midpoint of a region, into which the disposition regions 206 to 209 of the main bodies of the driving circuits 21 to 24 are integrated, in the first direction DR1 (FIG. 11 shows a midline CL1 that is an aggregate of such midpoints) is located between one end 205A and the other end 205B of a disposition region 215 of the overheat protection portion in the first direction DR1 as viewed from the second direction DR2.

Disposition regions 210 to 213 of fuses of the driving circuits 21 to 24 are arranged along the second direction DR2 and overlap with each other as viewed from the second direction DR2. The fuses of the driving circuits 21 to 24 are provided for the purpose of suppressing variations in circuit characteristics among the driving circuits 21 to 24. The fuses of the driving circuits 21 to 24 can be cut by, for example, laser trimming. As described above, the disposition regions 210 to 213 of the fuses of the driving circuits 21 to 24 are arranged along the second direction DR2 and overlap with each other as viewed from the second direction DR2, and thus a fuse cutting process can be simplified.

A configuration may be adopted in which, unlike this layout, the fuses of the driving circuits 21 to 24 are not provided, and the disposition regions 206 to 209 of the main bodies of the driving circuits 21 to 24 are the only regions related to the driving circuits 21 to 24.

A region 214 is a region in which the reference voltage generation portion 1 is disposed. A region 216 is a region in which the constant current source 2, the switch 3, the voltage comparison portion 4, the inverter 5, the MOS transistor 6, and the inverter 7 are disposed.

A region 217 is a region in which the switches 10 and 12 are disposed. Despite the fact that the external terminal MSET1 is provided near the first side 201 and the external terminal MSET2 is provided near the second side 202, the region 217 is provided near the first side 201. In this manner, the switch 10 and the switch 12 are disposed so as to be integrated but not to be separated from each other, and thus area efficiency in disposing the circuits in the semiconductor chip 200 can be enhanced.

A region 218 is a region in which there is disposed a circuit that generates a low potential-side power source voltage to be used in the driving circuits 21 to 24. Regions 219 to 222 are regions in which the abnormality detection circuits 31 to 34 are disposed, respectively. A region 223 is a region in which the control portion 8 is disposed.

Regions 224 to 227 are regions in which there are respectively disposed main bodies of setting circuits that each set a value of an output current outputted from a corresponding one of the external terminals OUT1 to OUT4. Disposition regions 228 to 231 of fuses of these four setting circuits are arranged along the second direction DR2 and overlap with each other as viewed from the second direction DR2. The fuses of the four setting circuits are provided for the purpose of suppressing variations in circuit characteristics among the four setting circuits. The fuses of the four setting circuits can be cut by, for example, laser trimming. As described above, the disposition regions 228 to 231 of the fuses of the four setting circuits are arranged along the second direction DR2 and overlap with each other as viewed from the second direction DR2, and thus a fuse cutting process can be simplified.

<Vehicle (Motorcycle)>

Figure 12:
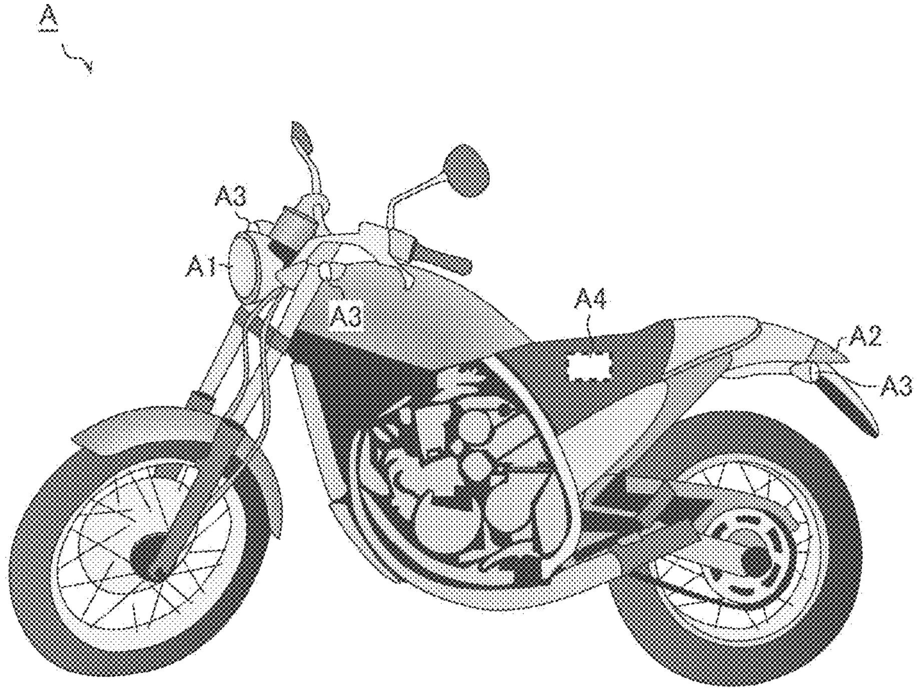
FIG. 12 is an external view of a motorcycle.
Figure 13:
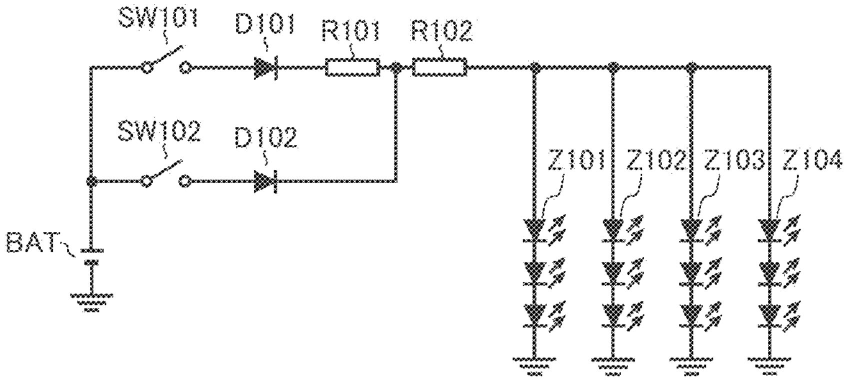
FIG. 13 is a view showing a typical configuration example of a light-emitting device.

FIG. 12 is an external view of a motorcycle. A motorcycle A shown in this figure is a type of vehicle referred to as a so-called mid-sized motorcycle (corresponding to a standard-sized motorcycle belonging to a category of vehicles having a displacement of more than 50 cc and not more than 40 cc in the Japanese Road Traffic Act). The motorcycle A includes an LED head lamp module A1, an LED rear lamp module A2, an LED winker lamp module A3, and a battery A4 that functions as a power source for these modules.

The LED rear lamp module A2 may have a configuration including a tail lamp, a stop lamp, and a license lamp or a configuration including the tail lamp and the stop lamp and not including the license lamp. In a case where the LED rear lamp module A2 has the configuration not including the license lamp, an LED license lamp module could be provided aside from the LED rear lamp module A2.

In this figure, for convenience of depiction, the LED head lamp module A1, the LED rear lamp module A2, the LED winker lamp module A3, and the battery A4 may be shown to be mounted at positions different from their actual positions.

An LED lamp module including the above-described multiple-output load driving device (a four-channel LED driver IC) 100 can be favorably used as the LED rear lamp module A2.

Other Modification Examples

While the present invention is exemplarily applied to a multi-channel LED driver IC in the foregoing embodiment, there is no limitation thereto. The present invention is broadly applicable to load driving devices in general that are required to limit power consumption inside the devices.

Furthermore, while the foregoing embodiment exemplarily describes a configuration using an LED as a light-emitting element, for example, an organic EL (electroluminescence) element can also be used as the light-emitting element.

Furthermore, while in the foregoing embodiment, one multiple-output load driving device (four-channel LED driver IC) 10 has the above-described functions of <First Switching Between Control Specifics>. <Second Switching Between Control Specifics>, and <Third Switching Between Control Specifics>, the multiple-output load driving device 100 may have only one of these functions.

As discussed above, in addition to the foregoing embodiment, it is-possible to add various modifications to the various technical features disclosed herein without departing from the spirit of the technical ingenuity involved. That is, the foregoing embodiment should be construed as exemplary in all respects and not limiting. It should be understood that the technical scope of the present invention is not limited to the foregoing embodiment and encompasses all modifications in the sense and scope equivalent to those of the claims.

LIST OF REFERENCE SYMBOLS

8 control portion
9 OR gate
10, 12 switch
11 AND gate
100 multiple-output load driving device (four-channel LED driver IC)
Z1 to Z4 LED string
MSET1, MSET2, OUT1 to OUT4 external terminal
A motorcycle (vehicle)
A2 LED rear lamp module

The invention claimed is:

1. A multiple-output load driving device, comprising:
a plurality of output terminals for outputting an output current to each of a plurality of loads;
a control portion configured to select either a non-DC current mode in which a non-DC current is used as the output current or a DC current mode in which a DC current is used as the output current; and
a first terminal,
wherein
in a case where a first signal is supplied to the first terminal, in the non-DC current mode, the non-DC current is outputted from all of the plurality of output terminals, and
in a case where a second signal different from the first signal is supplied to the first terminal, in the non-DC current mode, the DC current is outputted from a predetermined output terminal among the plurality of output terminals, while the non-DC current is outputted from a rest of the plurality of output terminals other than the predetermined output terminal.

2. The multiple-output load driving device according to claim 1, further comprising:
an abnormality detection portion configured to detect an abnormality in the predetermined output terminal; and
a second terminal,
wherein in a case where a third signal is supplied to the second terminal, when an abnormality in the predetermined output terminal has been detected by the abnormality detection portion, the output current is stopped from being outputted from the rest of the plurality of output terminals other than the predetermined output terminal, and
in a case where a fourth signal different from the third signal is supplied to the second terminal, even when an abnormality in the predetermined output terminal has been detected by the abnormality detection portion, the output current is outputted from the rest of the plurality of output terminals other than the predetermined output terminal.

3. The multiple-output load driving device according to claim 2, further comprising:
a third terminal,
wherein in the case where the third signal is supplied to the second terminal, a signal indicative of an abnormality is outputted from the third terminal, and
in the case where the fourth signal is supplied to the second terminal, the signal indicative of an abnormality is not outputted from the third terminal.

4. The multiple-output load driving device according to claim 2, wherein
the first terminal is identical to the second terminal,
the first signal is identical to the third signal, and
the second signal is identical to the fourth signal.

5. The multiple-output load driving device according to claim 1, wherein the plurality of output terminals are three or more output terminals, and the predetermined output terminal is a single output terminal.

6. The multiple-output load driving device according to claim 1, further comprising:

a plurality of abnormality detection portions configured to detect an abnormality in the plurality of output terminals, respectively; and a second terminal, wherein in a case where a third signal is supplied to the second terminal, when an abnormality has been detected by at least one of the plurality of abnormality detection portions, the output current is stopped from being outputted from all of the plurality of output terminals, and in a case where a fourth signal different from the third signal is supplied to the second terminal, even when an abnormality has been detected by at least one of the plurality of abnormality detection portions, the output current is outputted from, among the plurality of output terminals, an output terminal corresponding to any of the plurality of abnormality detection portions that has not detected the abnormality.

7. The multiple-output load driving device according to claim 6, further comprising:

a third terminal, wherein when an abnormality has been detected by at least one of the plurality of abnormality detection portions, a signal indicative of an abnormality is outputted from the third terminal.

8. A multiple-output load driving device, comprising:

a plurality of output terminals for outputting an output current to each of a plurality of loads;

an abnormality detection portion configured to detect an abnormality in a predetermined output terminal among the plurality of output terminals; and a first terminal, wherein in a case where a first signal is supplied to the first terminal, when an abnormality in the predetermined output terminal has been detected by the abnormality detection portion, the output current is stopped from being outputted from a rest of the plurality of output terminals other than the predetermined output terminal, and in a case where a second signal different from the first signal is supplied to the first terminal, even when an abnormality in the predetermined output terminal has been detected by the abnormality detection portion, the output current is outputted from the rest of the plurality of output terminals other than the predetermined output terminal.

9. A multiple-output load driving device, comprising:

a plurality of output terminals for outputting an output current to each of a plurality of loads;

a plurality of abnormality detection portions configured to detect an abnormality in the plurality of output terminals, respectively; and a first terminal, wherein in a case where a first signal is supplied to the first terminal, when an abnormality has been detected by at least one of the plurality of abnormality detection portions, the output current is stopped from being outputted from all of the plurality of output terminals, and in a case where a second signal different from the first signal is supplied to the first terminal, even when an abnormality has been detected by at least one of the plurality of abnormality detection portions, the output current is outputted from, among the plurality of output terminals, an output terminal corresponding to any of the plurality of abnormality detection portions that has not detected the abnormality.

10. The multiple-output load driving device according to claim 1, further comprising:

a high-withstand-voltage terminal; and a low-withstand-voltage terminal having a withstand voltage lower than a withstand voltage of the high-withstand-voltage terminal, wherein the first terminal or the second terminal is disposed between the high-withstand-voltage terminal and the low-withstand-voltage terminal.

11. The multiple-output load driving device according to claim 1, further comprising:

a first input terminal for accepting an input of a first input current from a power source;

a second input terminal for accepting an input of a second input current from the power source via an external resistor;

a current distribution portion configured to add together the first input current and the second input current at a predetermined distribution ratio so as to generate a driving current;

a distribution control portion configured to control the distribution ratio; and a plurality of driving circuits, wherein the driving current is supplied to a connection node of input ends of the plurality of driving circuits, output ends of the plurality of driving circuits are connected to the plurality of output terminals, respectively, in a plan view of a semiconductor chip, a disposition region of a power control section including the current distribution portion and the distribution control portion is located near a first side of the semiconductor chip, and disposition regions of main bodies of the plurality of driving circuits are located near a second side of the semiconductor chip that is opposite to the first side.

12. The multiple-output load driving device according to claim 11, wherein the disposition region of the power control section and each of the disposition regions of the main bodies of the plurality of driving circuits do not overlap with each other as viewed from a first direction substantially parallel to the first side and the second side.

13. The multiple-output load driving device according to claim 11, wherein the disposition region of the power control section is located at an end of the semiconductor chip in the first direction substantially parallel to the first side and the second side.

14. The multiple-output load driving device according to claim 11, wherein the disposition regions of the main bodies of the plurality of driving circuits are arranged along the first direction substantially parallel to the first side and the second side and overlap with each other as viewed from the first direction.

15. The multiple-output load driving device according to claim 11, wherein a plurality of pads wire-bonded to the plurality of output terminals, respectively, are arranged along the first direction substantially parallel to the first side and the second side and overlap with each other as viewed from the first direction.

16. The multiple-output load driving device according to claim 11, further comprising:

an overheat protection portion, wherein a midpoint of a region, into which the disposition regions of the main bodies of the plurality of driving circuits are integrated, in the first direction substantially parallel to the first side and the second side is located between one end and another end of a disposition region of the overheat protection portion in the first direction as viewed from a second direction orthogonal to the first direction.

17. The multiple-output load driving device according to claim 11, wherein disposition regions of fuses of the plurality of driving circuits are arranged along a second direction substantially orthogonal to the first side and the second side and overlap with each other as viewed from the second direction.

18. The multiple-output load driving device according to claim 6, further comprising:

a first input terminal for accepting an input of a first input current from a power source;

a second input terminal for accepting an input of a second input current from the power source via an external resistor;

a current distribution portion configured to add together the first input current and the second input current at a predetermined distribution ratio so as to generate a driving current;

a distribution control portion configured to control the distribution ratio; and a plurality of driving circuits, wherein the driving current is supplied to a connection node of input ends of the plurality of driving circuits, output ends of the plurality of driving circuits are connected to the plurality of output terminals, respectively, in a plan view of a semiconductor chip, a disposition region of a power control section including the current distribution portion and the distribution control portion is located near a first side of the semiconductor chip, disposition regions of main bodies of the plurality of driving circuits are located near a second side of the semiconductor chip that is opposite to the first side, and a disposition region of a first switch controlled by the first signal and the second signal and a disposition region of a second switch controlled by the third signal and the fourth signal are located near the first side of the semiconductor chip.

19. A lamp module, comprising:

the multiple-output load driving device according to claim 1; and a light source that is connected as a load to an output terminal of the multiple-output load driving device.

20. A vehicle, comprising:

the lamp module according to claim 19; and a battery that is used as a power source for the lamp module.

21. The vehicle according to claim 20, wherein the vehicle is a motorcycle, and the lamp module is a lamp module including a tail lamp, a stop lamp, and a license lamp.

* * * * *